United States Patent
Howorka

(10) Patent No.: US 8,108,293 B2
(45) Date of Patent: Jan. 31, 2012

(54) AUTOMATED TRADING SYSTEMS

(75) Inventor: Edward R. Howorka, Denville, NJ (US)

(73) Assignee: EBS Group Limted, London (GB)

( * ) Notice: Subject to any disclaimer, the term of this patent is extended or adjusted under 35 U.S.C. 154(b) by 202 days.

(21) Appl. No.: 12/685,060

(22) Filed: Jan. 11, 2010

(65) Prior Publication Data

US 2010/0114755 A1 May 6, 2010

Related U.S. Application Data

(62) Division of application No. 11/177,991, filed on Jul. 8, 2005, now Pat. No. 7,693,776.

(60) Provisional application No. 60/586,996, filed on Jul. 9, 2004.

(51) Int. Cl.
G06Q 40/00 (2006.01)

(52) U.S. Cl. .......................... 705/37; 705/35

(58) Field of Classification Search .............. 705/35, 705/37
See application file for complete search history.

(56) References Cited

U.S. PATENT DOCUMENTS

| | | | |
|---|---|---|---|
| 5,375,055 A | 12/1994 | Togher et al. | |
| 5,379,055 A | 1/1995 | Yoshida et al. | |
| 5,806,050 A | 9/1998 | Shinn et al. | |
| 6,014,627 A | 1/2000 | Togher et al. | |
| 6,321,202 B1 | 11/2001 | Raveis, Jr. | |
| 6,519,574 B1 | 2/2003 | Wilton et al. | |
| 6,584,451 B1 | 6/2003 | Shoham et al. | |
| 6,594,633 B1 | 7/2003 | Broerman | |
| 6,807,635 B1 | 10/2004 | Kleckner | |
| 7,110,972 B1 | 9/2006 | Handa et al. | |
| 7,310,616 B2 | 12/2007 | Sugahara | |
| 2001/0005829 A1 | 6/2001 | Raveis | |
| 2001/0037230 A1 | 11/2001 | Raveis et al. | |
| 2001/0047282 A1 | 11/2001 | Raveis | |
| 2002/0002545 A1 | 1/2002 | Resneck | |
| 2002/0007334 A1 | 1/2002 | Dicks et al. | |
| 2002/0023030 A1 | 2/2002 | Prohaska et al. | |
| 2002/0023033 A1 | 2/2002 | Campbell et al. | |
| 2002/0032579 A1 | 3/2002 | Harpale | |
| 2002/0046159 A1 | 4/2002 | Raveis | |
| 2002/0049624 A1 | 4/2002 | Raveis | |
| 2002/0069176 A1 | 6/2002 | Newman | |
| 2002/0083015 A1 | 6/2002 | Yoshifuku et al. | |
| 2002/0087452 A1 | 7/2002 | Megiddo | |
| 2002/0091624 A1 | 7/2002 | Glodjo et al. | |
| 2002/0099647 A1 | 7/2002 | Howorka et al. | |

(Continued)

FOREIGN PATENT DOCUMENTS

EP 0 399 850 A2 11/1990

(Continued)

*Primary Examiner* — Jagdish Patel
*Assistant Examiner* — Sara Chandler
(74) *Attorney, Agent, or Firm* — Dickstein Shapiro LLP

(57) ABSTRACT

In an electronic trading system, prime brokerage services may be provided by assigning one or more dependent or child deal codes to a deal code. Prime broker trades are conducted via the dependent deal codes but appear to the market as deals with the parent deal code using credit assigned to the parent deal code. The prime bank customer is a dependent deal code of the customer bank which also trades on the system, allowing credit to be allocated by the customer dependent code for prime broker trades. A deal code may have several dependent deal codes which can trade with one another. Dependent deal codes can be used to expand the size of trading floors beyond that which can be supported by a single deal code and to assist in migration between system versions.

4 Claims, 8 Drawing Sheets

U.S. PATENT DOCUMENTS

| | | |
|---|---|---|
| 2002/0103667 A1 | 8/2002 | Jannah et al. |
| 2002/0116332 A1 | 8/2002 | Sanchez |
| 2002/0133455 A1 | 9/2002 | Howorka et al. |
| 2002/0138400 A1 | 9/2002 | Kitchen et al. |
| 2002/0152153 A1 | 10/2002 | Nakagawa |
| 2002/0152156 A1 | 10/2002 | Tyson-Quah |
| 2002/0156726 A1 | 10/2002 | Kleckner et al. |
| 2002/0174066 A1 | 11/2002 | Kleckner et al. |
| 2002/0184135 A1 | 12/2002 | Zakaria |
| 2002/0188553 A1 | 12/2002 | Blauvelt et al. |
| 2003/0018561 A1 | 1/2003 | Kitchen et al. |
| 2003/0055772 A1 | 3/2003 | Goldstein |
| 2003/0061147 A1 | 3/2003 | Fluhr et al. |
| 2003/0069836 A1 | 4/2003 | Penney et al. |
| 2003/0074273 A1 | 4/2003 | Miller et al. |
| 2003/0083973 A1 | 5/2003 | Horsfall |
| 2003/0084001 A1 | 5/2003 | Chang |
| 2003/0088509 A1 | 5/2003 | Wilton et al. |
| 2003/0139996 A1 | 7/2003 | D'Antoni et al. |
| 2003/0149653 A1 | 8/2003 | Penney et al. |
| 2003/0149654 A1 | 8/2003 | Harrington et al. |
| 2003/0154171 A1 | 8/2003 | Karp et al. |
| 2003/0163413 A1 | 8/2003 | Wiczkowski |
| 2004/0133506 A1 | 7/2004 | Glodjo et al. |
| 2004/0186806 A1 | 9/2004 | Sinclair et al. |
| 2006/0010065 A1 | 1/2006 | Howorka |
| 2006/0100954 A1 | 5/2006 | Schoen |
| 2006/0259391 A1 | 11/2006 | Schoen et al. |
| 2008/0228661 A1 | 9/2008 | Silitch et al. |

FOREIGN PATENT DOCUMENTS

| | | |
|---|---|---|
| GB | 2 363 875 | 1/2002 |
| GB | 2 363 876 | 1/2002 |
| JP | 11-053450 A | 2/1999 |
| JP | 2002-324165 A | 11/2002 |
| WO | WO-97/22072 | 6/1997 |
| WO | WO-01/75658 A2 | 10/2001 |
| WO | WO-01/75751 A2 | 10/2001 |
| WO | WO-01/75752 A2 | 10/2001 |
| WO | WO-01/75753 A2 | 10/2001 |
| WO | WO-01/98959 A2 | 12/2001 |
| WO | WO-02/25546 A1 | 3/2002 |
| WO | WO-02/39401 A2 | 5/2002 |
| WO | WO-02/086660 A2 | 10/2002 |
| WO | WO-02/093294 A2 | 11/2002 |
| WO | WO-03/023564 A2 | 3/2003 |
| WO | WO-03/058488 A1 | 7/2003 |
| WO | WO-03/069444 A2 | 8/2003 |
| WO | WO-03/073302 A1 | 9/2003 |
| WO | WO-04/001533 A2 | 12/2003 |
| WO | WO-2004/040422 A2 | 5/2004 |
| WO | WO-2004/044811 A1 | 5/2004 |

| Date/Time | Trader Maker/Taker | Cparty Floor | Cparty Trader | Buy/Sell | Currency | Price | Size | Reference No. | Our Ticket# | Their Ticket# |
|---|---|---|---|---|---|---|---|---|---|---|
| 10 Feb 15:10 | PBD | 1PBX | | SELL | AUD/USD | 12.0052 | 5 | 056B-005E-0000-01 | 455 | 9314 |
| 10 Feb 21:56 | PBD | 1PBX | T | BUY | EUR/GBP | 0.66015 | 5 | 056B-0062-000A-01 | 456 | 9403 |
| 10 Feb 21:50 | PBD | 1PBX | T | BUY | EUR/USD | 1.0727 | 10 | 056B-0062-0001-01 | 458 | 11051 |
| 10 Feb 21:55 | PBD | 1PBX | M | SELL | EUR/USD | 1.0727 | 5 | 056B-00B7-0012-01 | 464 | 11061 |
| 10 Feb 21:56 | PBD | 1PBX | T | BUY | EUR/USD | 1.0726 | 10 | 056B-0062-0009-01 | 465 | 11062 |
| 10 Feb 21:49 | PBD | 1PBX | T | BUY | GBP/USD | 1.6275 | 5 | 056B-0062-0000-01 | 457 | 9395 |
| 10 Feb 21:52 | PBD | 1PBX | T | BUY | GBP/USD | 1.6275 | 5 | 056B-0062-0005-01 | 462 | 9400 |
| 10 Feb 21:52 | PBD | 1PBX | M | BUY | USD/CHF | 1.3660 | 3 | 056B-0062-0006-01 | 463 | 9401 |
| 10 Feb 21:52 | PBD | 1PBX | M | SELL | USD/CHF | 1.3661 | 10 | 056B-00B7-000F-01 | 460 | 11058 |
| 10 Feb 21:52 | PBD | 1PBX | T | BUY | USD/JPY | 121.25 | 2 | 056B-00B7-0010-01 | 461 | 11059 |
| 10 Feb 21:50 | PBD | 1PBX | T | SELL | USD/MXT | 2.5200 | 10 | 056B-0062-0002-01 | 459 | 9399 |
| 10 Feb 21:15 | PBD | 1PBX | T | SELL | USD/MXT | | 50 | 056B-0062-0003-01 | 456 | 9386 |

Total EBS Makes: 3   Total EBS Takes: 9   Total EBS Deals: 12

AUTOMATED TRADING SYSTEMS

This Application is a Division of Application 11/177,991 filed on Jul. 8, 2005, and claims the benefit of U.S. Provisional Application 60/586,996, filed on Jul. 9, 2004, each of which is hereby incorporated by reference.

FIELD OF THE INVENTION

This invention relates to automated trading systems for trading products between traders, and in particular to the manner in which trading floors are identified to the trading system and each other. The invention is particularly, but not exclusively, concerned with prime brokerage systems.

BACKGROUND OF THE INVENTION

WO2004/040422 of Electronic Broking Services Ltd describes a prime brokerage system. Prime brokerage is also described in WO2004/001533 of FX Alliance LLC. Prime brokerage, as a concept, has existed for many years and involves a party with credit trading on behalf of a party without credit for a fee. Thus, if bank A wishes to trade with Bank B but has no bilateral credit with bank B, bank A can use the services of bank C who has bilateral credit with bank B. Bank C will enter into a transaction with bank B and charge bank A a fee for trading on their behalf.

Both WO2004/040422 and WO2004/001533 disclose ways in which prime brokerage can be integrated into an anonymous automated trading system. Anonymous trading systems are well known in the art. One example is the EBS system operated by EBS Group Limited of London, UK to trade foreign exchange spot currencies and precious metals in the interbank market.

The system of WO2004/040422 enables traders at an institution to trade through a prime broker bank, giving them access to prices they would not otherwise be able to see. The prime broker bank enters into a deal with the counterparty and then executes a deal for the same amount with the party on whose behalf they have traded. That latter deal may be at a favourable price to the prime broker bank so that the prime broker bank can make a profit out of the transaction, alternatively, the prime broker bank may charge a fee for making its credit available to their customer bank.

The prime broker customer, that is the bank that uses the prime broker's credit, actually logs onto the system as the prime broker. They may log onto a specific prime broker deal code which is a virtual code shared by prime broker customers. This deal code will be seen as the counterparty to prime broker trades by third parties and will be seen as one of a number of trading floors operated by an institution. Other trading floors will be real trading floors at various locations around the world. Within the system, all the trading floors, whether real or virtual, have the same status.

Alternatively, there may be no prime broker deal code and the prime broker customer logs onto, and trades as, the prime broker bank. Counterparties cannot even see whether they have traded with the bank's own trading floor or with an unknown third party via the bank acting as a prime broker.

A different approach to increasing liquidity is disclosed in WO97/22072 of Reuters Limited. Rather than using a prime broker, name switching is used. The system waits until it can see that a potential deal exists were it not for a lack of credit and then switches the identity to one of the parties to the deal to a party who has credit to do the deal. The parties to the name switch can then reconcile their positions with each other. This approach requires constant monitoring of all bids and offers, credit limits and ownership of quotes in order that name switch opportunities can be identified. It is more suited to a host system architecture where all bid and offers are matched, executed and credit checked at the same location.

We have appreciated that there are aspects of the existing proposals for offering prime brokerage on trading systems which are not satisfactory. These problems relate to the relationship between prime broker banks and their customers, and the manner in which the trading system handles and identifies these relationships.

SUMMARY OF THE INVENTION

The invention, in its various aspects, aims to address these problems.

Broadly, the invention resides in the use of parent and dependent, or child, deal codes. A parent deal code may be seen by the market as the party to a trade although the trade has been made via a child deal code.

More specifically, there is provided an electronic trading system for trading products between counterparties, comprising: a plurality of counterparty trading floors, for submitting quotes to buy or sell products being traded on the system, each trading floor having a unique trading floor code to identify it to other counterparty trading floors; wherein at least one of the counterparty trading floors comprises a parent trading floor code and at least one dependent trading floor code, and wherein trades made via the dependent trading floor code are shown to counterparties as trades with the parent trading floor code.

The invention also provides a method of trading on an electronic trading system in which parties trading on the system are arranged into trading floors each having a unique trading floor code to identify the trading floor to other trading floors trading on the system, the method comprising assigning a dependent trading floor code to at least one parent trading floor code, and showing trades made via the dependent trading floor code as trades between a counterparty with the parent trading floor code.

Preferably, the dependent trading floor code is assigned to a prime broker offering prime brokerage to third party banks trading on the system. A prime brokerage trading floor code may provide prime brokerage to a customer bank being a counterparty on the system and having a unique trading floor code, the customer bank floor code having a dependent floor code, wherein the prime brokerage is provided to the dependent trading floor code of the customer bank.

Preferred embodiments of the invention have the advantage that credit may be assigned from the child floor code of a customer bank to the child floor code of a prime broker bank. Prime brokerage trades are conducted from the customer child floor to the market via the prime broker child floor. A particular bank trading on the system may operate through multiple prime brokers with a child or dependent trading floor code being assigned to each prime broker dependent deal code. As a bank may have multiple dependent deal codes, each of which trades via different trading options, those dependent deal codes may trade with each other.

Trades made via dependent deal codes appear to counterparties and to others on the trading system as trades made by the parent deal code. They use credit assigned to the parent deal code.

The use of parent and child deal codes has advantages beyond prime brokerage. A trading floor may be subdivided into two dependent deal codes once the number of traders trading on the floor has exceeded the maximum that a single floor code can handle. The splitting of the code into two dependent deal codes, enables further traders to be added without having to establish a new deal code that is seen by counterparties. This means that the counterparties do not have to assign credit to a fresh deal code and the addition of further trader workstations and child deal codes is invisible. The use of child deal codes is also advantageous when migrating trading floors between different versions of system software or hardware.

BRIEF DESCRIPTION OF THE DRAWINGS

Embodiments of the invention will now be described, by way of example only, and with reference to the accompanying drawings, in which:

FIG. 8 is a partial screen shot of a prime broker customer display;

FIG. 9 is a view of the trader deals panel of FIG. 8;

FIG. 10 is a view of the prime broker customer's deal log; and

DESCRIPTION OF PREFERRED EMBODIMENTS

Figure 1:
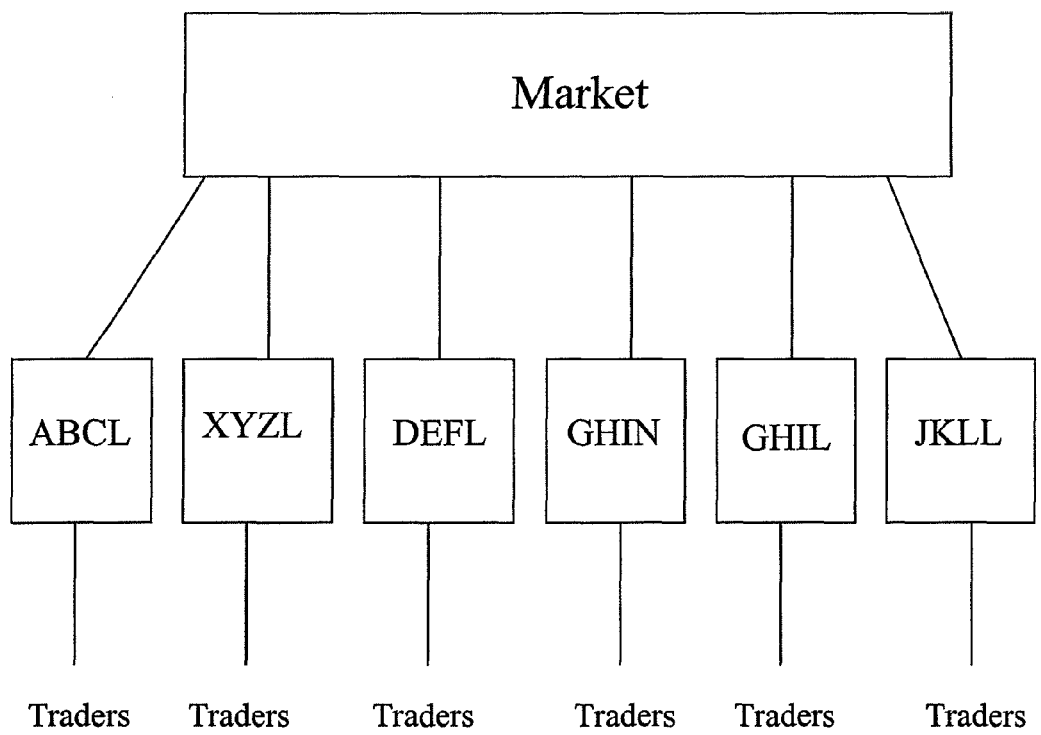
FIG. 1 is a schematic illustration of a number of trading floors trading on a trading system.

Embodiments of the invention may be implemented on any type of trading system in which parties may be prevented from trading with one another, through lack of credit or some other factor. The embodiment to be described is an anonymous trading system but the invention is not limited to that type of system. The trading system may use a dedicated network to pass messages and data between traders and the system or it may use a public network such as the Internet. The example to be described is particularly directed to the trading of a financial instrument such as foreign exchange spot or precious metals. However, the invention is applicable to any trading system trading any tradable product, whether it is a financial instrument, commodity or any other tradable goods. Within the realm of financial instruments, the invention is applicable to any tradable financial instrument including OTC (over the counter) and exchanged base products. Thus, the following example is intended only to illustrate the principles of the invention and is not limiting. One example of a trading system on which embodiments of the invention may be deployed is disclosed in U.S. Pat. No. 5,375,055(Togher), the contents of which are incorporated herein by reference. In the following description, references to a trader refer to a trader workstation through which traders interface with the trading system or to an automated trading interface, which is a workstation running a trading algorithm which interfaces with the trading system in dependence on market conditions. References to prime banks and prime customers refer to workstations under the control of the banks or customers. Parent and child deal codes may be implemented on the same or different workstations as may prime customer intra floor deal codes.

In a typical trading system, such as the EBS F/X spot trading system operated by EBS Dealing Resources, Inc, trading floors of financial institutions trade with one another. An institution may include several trading floors located in different parts of the world and belong to different legal entities all forming part of the same global institution group. Thus, a large multinational bank may have local trading banks in different countries. Each of these is a legal entity in its own right. Each of those legal entities will have one or more specified sites. This is a contractual definition related to sites to which the system provider agrees to provide services. In practice, this has been interchangeable with deal code, trading floor or a dealing unit.

A specified site may have a number of products associated with it that trade on the same trading systems. Thus, a specified site trading on the EBS system may include the bank's FX traders on the spot system, the banks trading through a prime broker (although in the prior art they log in as the prime broker), and an automated trading interface which trades on the system without intervention of traders according to a trading algorithm proprietary to the bank.

A deal code is an attribute of a product. Deal codes are four letter identifiers which identify the party to a deal or a quote (where a system is not anonymous). Deal codes are standardised throughout the industry, and the term is used interchangeably with bank code, trading floor and dealing unit. FIG. 1 shows an example of a number of deal codes trading in a market.

The present invention introduces the concept of parent and child deal codes. In the following example this will be described in relation to prime broker banks and prime broker customer banks. However, its application is much broader and, as discussed below, has considerable technical benefits allowing for expansion of trading floors without a complete reconfiguration of the system.

Figure 2:
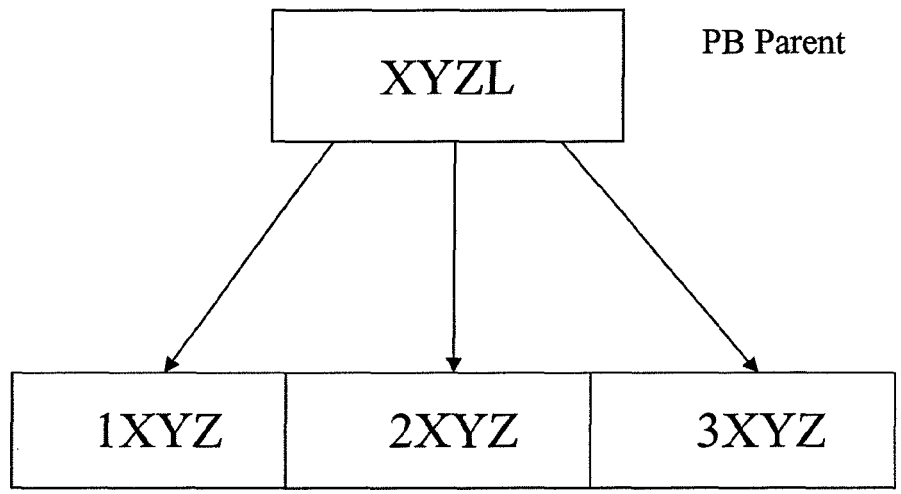
FIG. 2 illustrates the concept of a prime broker parent.

FIG. 2 illustrates the concept of a prime broker parent XYZL which has three child floors, 1XYZ, 2XYZ and 3XYZ. A prime broker parent is a trading floor that allows other trading floors to utilise its credit. A prime broker (PB) parent may support a plurality of prime brokers, for example by geography or product type.

Figure 3:
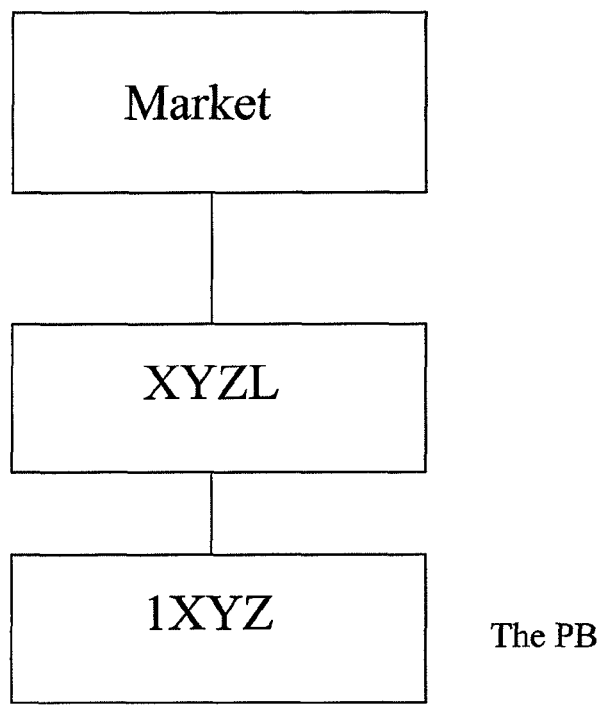
FIG. 3 illustrates the relationship between a prime broker parent, child and the market.

The children of the PB parent are referred to as prime banks (PBs). These are deal codes designated by the spot parent (XYZL in FIG. 2) that allows the parent to offer prime brokerage to the market. These are 1XYZ, 2XYZ and 3XYZ in FIG. 2. Each PB deal code enables a prime customer to utilise the PB's bilateral credit in the market to deal in the market in situations where they would have insufficient credit to deal themselves. FIG. 3 shows the relationship between the market, the prime broker parent XYZL and the prime broker bank (or child) 1XYZ.

Figure 4:
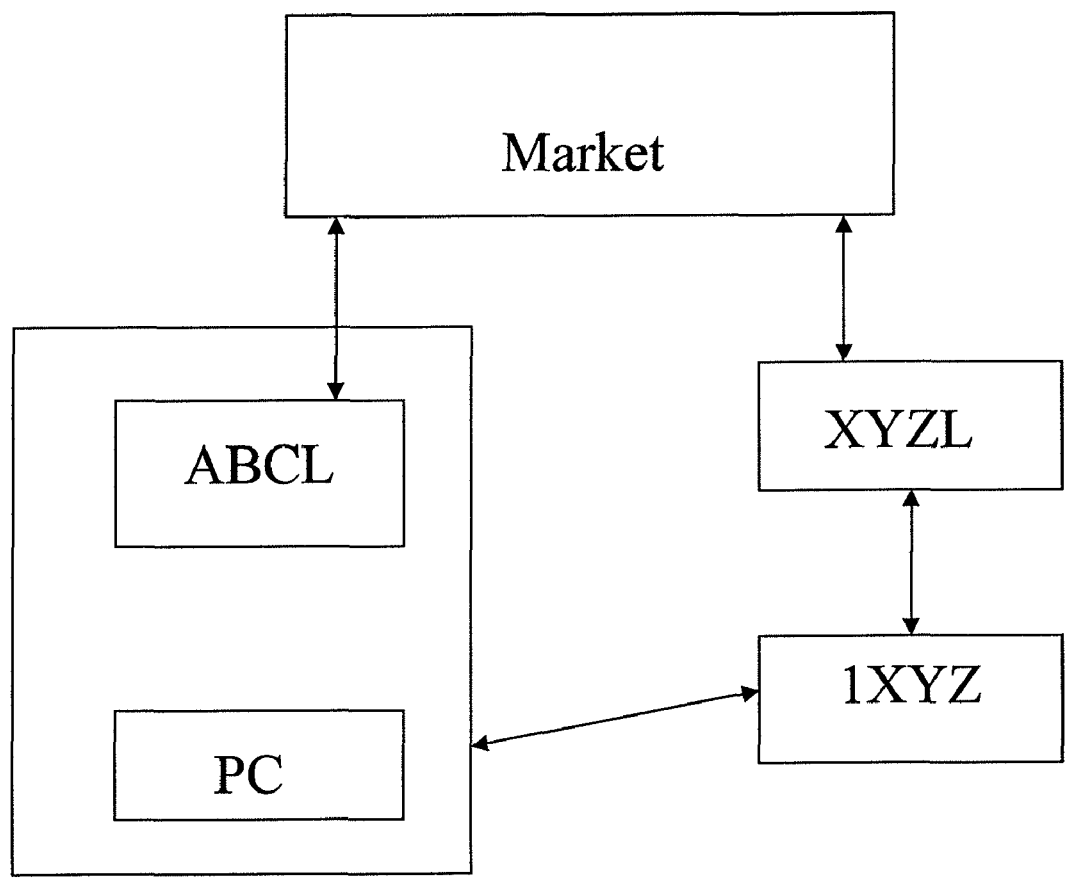
FIG. 4 illustrates the relationship between a prime customer deal code and a prime bank deal code.

A prime customer is a user of the system who has chosen to utilise a prime bank's access to greater depth in counterparties and better prices to trade. A unique deal code is created for the customer that allows the user to trade through a prime bank. This is illustrated in FIG. 4. The prime customer PC is a different deal code to the prime customer parent ABCL. The prime customer trades through the prime bank 1XYZ. This arrangement contrasts with the prior art system of WO2004/040422 in which there was no concept of a parent and child banks and to secure prime brokerage, a trader from bank ABC would have logged onto the trading system as floor DEFL.

Thus, bank ABC is the prime customer parent bank and ABCL's traders utilise XYZL's prices in addition to their own. However, the system configures this by use of a prime customer child deal code (PC deal codes) and a prime bank child deal code.

The use of PC deal codes enables the system to support intra-floor dealing between traders from different deal codes on a physical/virtual trading floor. This might arise where a bank subscribes to several prime brokers, say XYZL and DEFL. Each of these prime customers will have their own deal code, e.g., PC1 and PC2 and the bank with have its own code ABCL.

Here, a single trading floor has three separate dealing codes which can trade with each other. Thus there is no longer a one to one correlation between trading floors and deal codes. As shown in FIG. 4, the bank has its own spot dealing code ABCL and a prime customer code PC which connects into a prime bank !XYZ and utilises the credit of the prime parent XYZ. It is not mandatory that a prime customer has a spot code that trades directly on the trading system.

Figure 5:
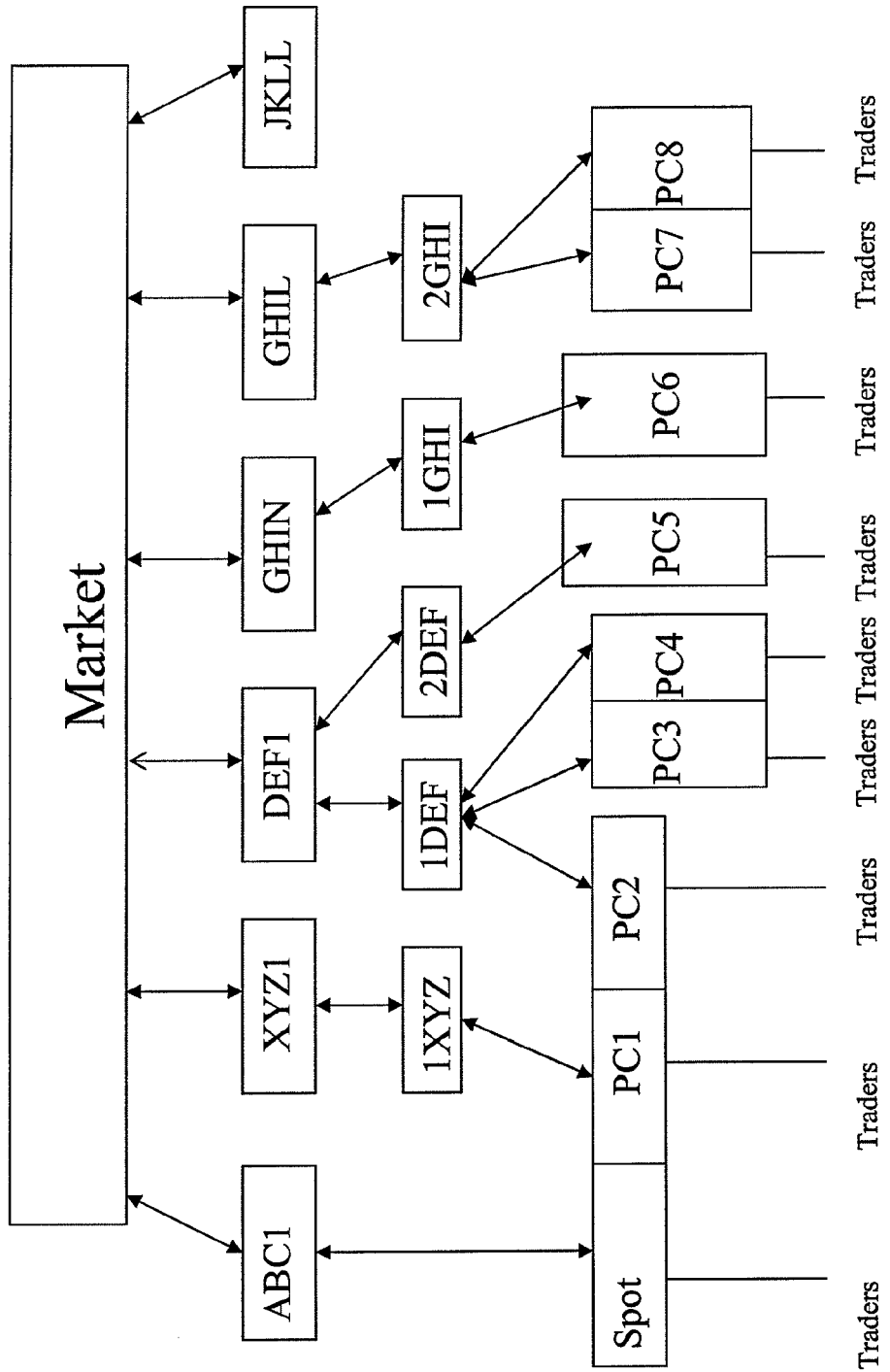
FIG. 5 shows how a trading floor can trade on the system using several different deal codes.

FIG. 5 illustrates a trading floor that consists of three deal codes. Six banks trade directly with the market: ABCL, XYZL, DEFL, GHIN, GHIL and JKLL. The fourth letter represents the location of the bank. Thus L represents London and N represents New York. It follows that GHIN and GHIL are different floors of the same bank. They may be different legal entities of the same global institution group or they may be part of the same legal group. Four of the banks offer prime brokerage services to customers and have established prime bank codes. Bank DEFL has set up two prime bank codes 1DEF and 2DEF and as GHIN and GHIL are part of the same global institution they set up their own prime banks as 1GHI and 2GHI. Each of the prime banks have customers PC1 to PC8.

Tables 1 to 4 show the perspective of some of the trading floors. Table 1 shows the perspective from ABCL spot trader; table 2 from 1XYZ PC1 trader at bank ABCL; table 3 from 1DEF PC2 trader perspective; and table four from the perspective of a spot trader in CHIN. That trader will not see any of the prime banks as they are shown to the market as prime broker parents.

TABLE 1

| COUNTER-PARTY | PC/PB CREDIT LIMIT | PB/CTPY CREDIT LIMIT | DEALS/ MARKET DATA | BILL-ABLE | COLOUR |
|---|---|---|---|---|---|
| JKLL (Spot Trader) | N/A | Y | Y | Y | Yellow |
| DEFL (Spot Trader) | N/A | Y | Y | Y | Yellow |
| ABCL (Spot Trader) | N/A | N | N | N | White |
| 1XYZ (PC1) | N/A | Y | N | Y | Yellow |
| 1DEF (PC2) | N/A | Y | N | Y | Yellow |
| 1DEF (PC3) | N/A | Y | Y | Y | Yellow |
| IGHI (PC5) | N/A | Y | Y | Y | Yellow |

TABLE 2

| COUNTER-PARTY | PC/PB CREDIT LIMIT | PB/CTPY CREDIT LIMIT | DEALS/ MARKET DATA | BILL-ABLE | COLOUR |
|---|---|---|---|---|---|
| JKLL (Spot Trader) | Y | Y | Y | Y | Yellow |
| XYZL (Spot Trader) | Y | Y | Y | Y | Yellow |
| ABCL (Spot Trader) | Y | Y | N | Y | Yellow |
| 1DEF (PC2) | Y | Y | N | Y | Yellow |

TABLE 2-continued

| COUNTER-PARTY | PC/PB CREDIT LIMIT | PB/CTPY CREDIT LIMIT | DEALS/ MARKET DATA | BILL-ABLE | COLOUR |
|---|---|---|---|---|---|
| 1DEF (PC3) | Y | Y | Y | Y | Yellow |
| 1GHI (PC5) | Y | Y | Y | Y | Yellow |
| 1XYZ (PC1) | N | N | N | N | White |

TABLE 3

| COUNTER-PARTY | PC/PB CREDIT LIMIT | PB/CTPY CREDIT LIMIT | DEALS/ MARKET DATA | BILL-ABLE | COLOUR |
|---|---|---|---|---|---|
| JKLL (Spot Trader) | Y | Y | Y | Y | Yellow |
| DEFL (Spot Trader) | Y | Y | Y | Y | Yellow |
| ABCL (Spot Trader) | Y | Y | N | Y | Yellow |
| 1XYZ (PC1) | Y | Y | N | Y | Yellow |
| 1DEF (PC2) | N | N | N | N | White |
| 1DEF (PC3) | Y | Y | Y | Y | Yellow |
| 2DEF (PC8) | Y | N | Y | Y | Yellow |
| IGHI (PC5) | Y | Y | Y | Y | Yellow |

TABLE 4

| COUNTER-PARTY | PC/PB CREDIT LIMIT | PB/CTPY CREDIT LIMIT | DEALS/ MARKET DATA | BILL-ABLE | COLOUR |
|---|---|---|---|---|---|
| JKLL (Spot Trader) | N/A | Y | Y | Y | Yellow |
| GHIL (Spot Trader) | N/A | Y | Y | Y | Yellow |

In the tables above, the column marked PC/PB refers to credit between the prime customer and the prime bank and is discussed below. The PB/counterparty credit limit indicates credit extended between prime broker parents and various counterparties on the system. The Deal/Market Data column refers to the display of done deals and market data and the billable column refers to whether the taker will be billed by the system operator. In table 1, for example, deals between ABCL and ABCL are intra-floor deals and not billable (or tradable). Finally, the last column indicates the colour that the quotes will appear on the screen, although any combination of colours could be used. In this example, yellow indicates a dealable non intra-floor deal and white indicates a non-dealable price from the same floor.

Thus FIG. 5 shows how a bank, through use of prime customer deal codes, can have access to several prime brokers via their prime banks.

In the system of WO2004/040422, the prime broker customer traded as the prime broker using their deal code. The arrangement discussed above enables credit limits to be established between prime customers and prime banks. These limits may be established by the prime customers rather than the prime banks as in the prior art. Prime customers can manage their trade-day risk by assigning the amount of credit to which they wish their traders to have access. The lowest of this value, and the credit assigned by the PB to the PC is the actual exposure.

The PC will see the market view of its PB as long as it has reciprocal credit with the PB. The PC's dealable currency pairs (in the case of FX trading) is the intersection of the PB's dealable currency pairs, the PC's dealable currency pairs and the currency pairs that the PB has permissioned the PC to see. It will be understood that the PC will always remain anonymous to the market counterparty.

As PCs can assign credit to PB transactions, each PC has a trading floor administrator function. This may be set up on a trader terminal or a separate terminal and has the same functions as a standard TFA function including credit, settlement, user and report management. The PC TFA can only assign credit to the floor code of its PB and the PB parent is not able to see their children (the prime banks) nor are they able to assign credit to them.

A PC is unable to see any credit events that occur between a PB and the interbank market. A credit event includes an indication that credit is low or exhausted.

The system does not allow traders to hit their own prices but traders in the same PC deal code can trade with one another. These trades do not affect the credit limits between the PB and PC. The system does not bill the taker (or the maker) for these trades.

Figure 6:
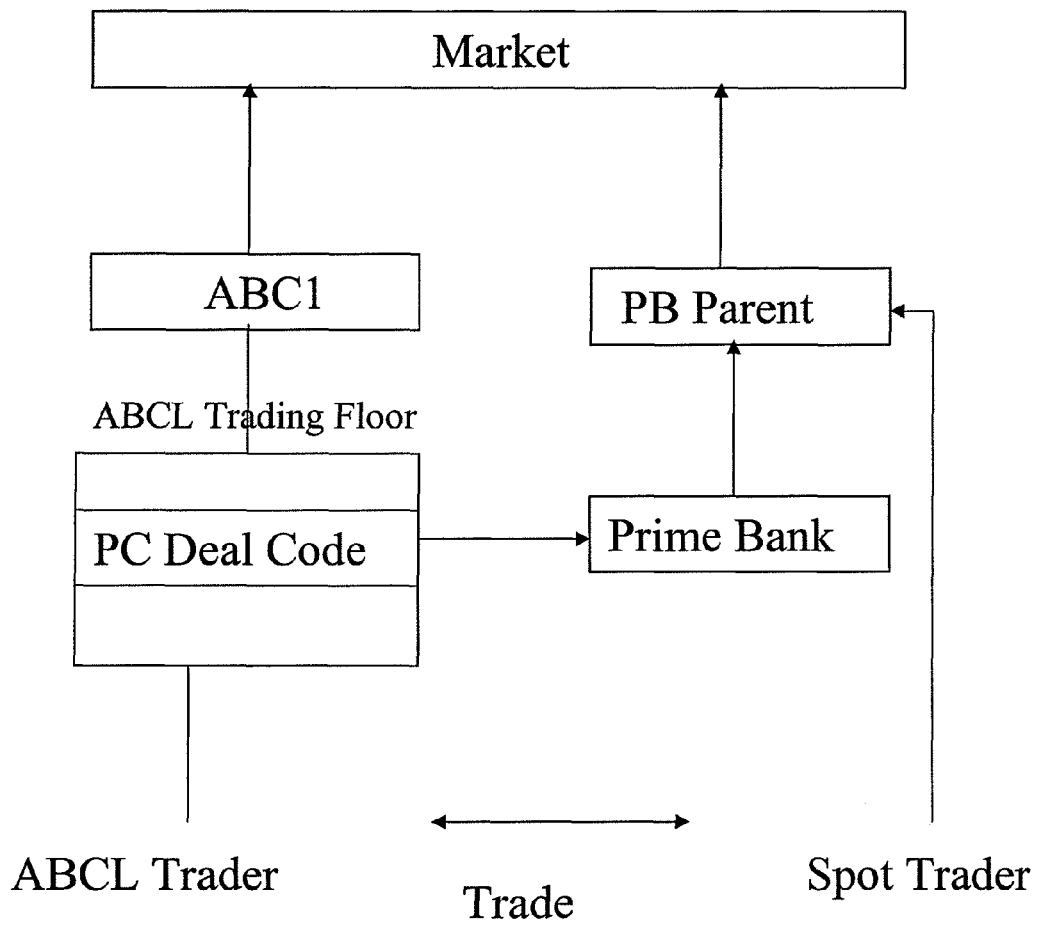
FIG. 6 illustrates trades between a prime customer and the prime parent.

FIG. 6 shows how a PC trader may trade with a prime broker parent. These trades are reflected in the done deals information and market data information that is made available to other traders. These trades will cause a reduction in the credit between PC-PB, PB-PC and PB-PB parent. A prime customer actually deals with the prime bank which, in turn, proxies for the prime parent in dealing with the counterparty (that is, the prime parent code itself is completely out of the picture in the literal transaction flow). There is one market transaction between the prime-bank-as-parent and counterparty, and one 'prime' transaction between the prime customer and prime bank (where the prime bank can add additional brokerage, etc).

Figure 7:
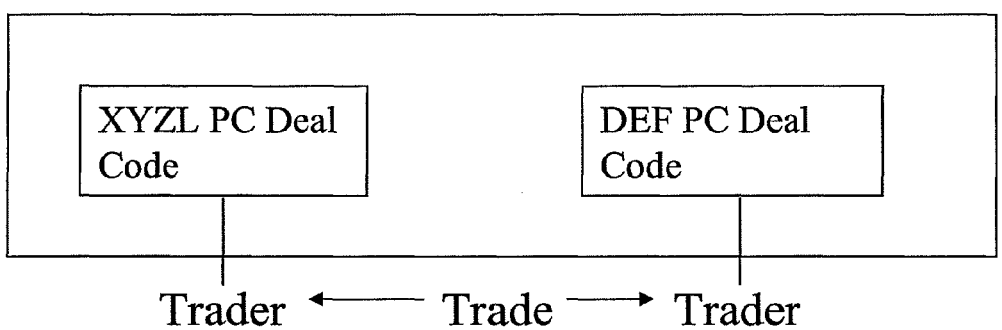
FIG. 7 illustrates trades between traders on the same physical floor with different dealing codes.

FIG. 7 shows how trades between traders on the same physical floor, but different deal codes, are treated as Prime Intra-Floor trades. These are not reflected in deal or market data but do have an effect on credit limits and are billable.

Figures 8, 9:
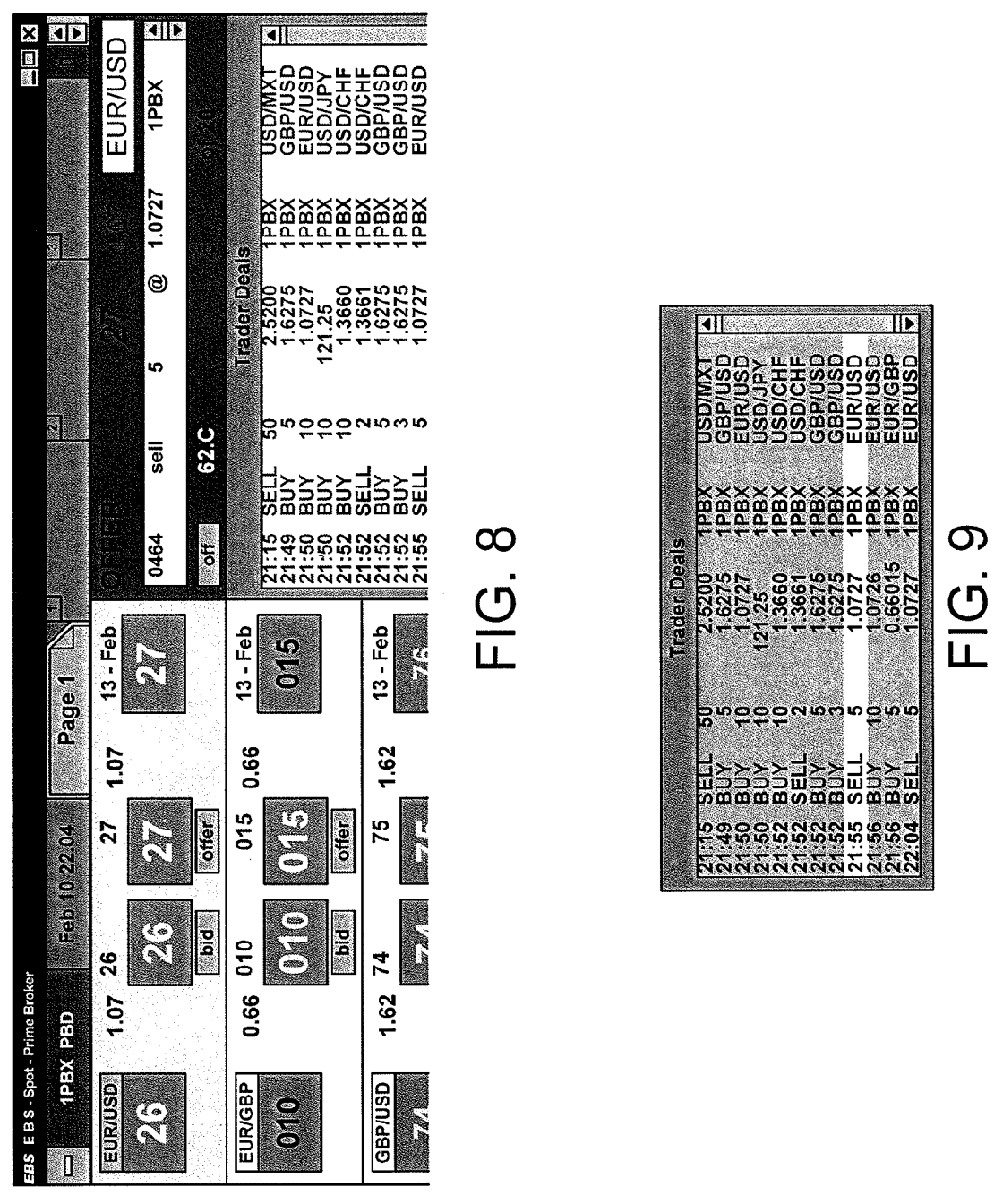

FIGS. 8 to 10 show examples of screen displays seen by traders using a system embodying the invention. In FIG. 8 there is shown a portion of the display seen by a prime broker customer of a prime bank 1PBX. Prime Customers can act as Takers and Market Makers in the market. All prices shown on the Prime Customer workstation are dealable and credit screened. The prices displayed are the actual rates available to deal on and do not include any Prime fees. Contractually agreed fees are reflected post-trade in the Deal Ticket as an additional spread to the dealt rate. The Trader Deals panel (shown in more detail in FIG. 9) and the Deal Log (shown in FIG. 10) show the traded rate before the fee spread has been included.

As can be seen from FIGS. 8 to 10, as all deals transacted on the Prime Customer workstation are completed in the name of the Prime Broker, the counterparty shown in the Trader Deals panel is always the Prime Broker 1PBX.

In the system of WO2004/040422, the prime broker customer logged onto the trading system as the prime broker itself. Thus, the trading system, as well as counterparties interacting with the prime broker customer saw all messages as originating from the prime broker. In the embodiment of the present invention described, the prime broker customer (pbc) has its own dealing code, which is a child code of the prime broker customer bank. This bank is eligible to trade on the trading system in its own right but may choose to trade via the prime broker to gain access to better prices from counterparties who would not extend credit to it. Thus the pbc is an active trading floor and orders that are submitted by the pbc are submitted from the pbc trading floor directly to the market regardless of whether the order makes use of the prime broker and regardless of whether the order will appear to counterparties as if it had originated from the prime broker bank. This approach requires that the order submitted includes prime broker information so that credit relations of the prime broker trading floor and market counterparties can be taken into account when matching deals. It should be noted that the pbc may use the prime broker both for making and taking prices. When the pbc is a maker, that is they are putting prices into the market, their prices will be visible to more counterparties in a credit screened market than if they submitted the prices in their own name. Orders are submitted to the system in an order submission message. The exact nature of this message will depend on the type of order, for example whether it is a buy or sell order or a visible (bid/offer) or invisible (hit/take) order. However, when the order is submitted directly from the prime broker customer, the order must include an identification of the fact that it is a prime broker order and include the identity of the prime broker. In practice, the mere inclusion of the identity of the prime broker is sufficient for the order to be interpreted by the system as a prime broker order.

The system described may be enhanced to enable the prime broker customer to trade through one of a plurality of possible prime brokers. The prime brokers to which the pbc subscribes may have different prices available at any given time and the pbc will want to trade via the prime broker that gives them the best price. When the pbc is acting as a maker, that is they are putting prices into the market, they will not know to whom the prices are distributed for each of the prime brokers. That is, they will not know exactly with whom the prime broker bank has credit relationships. When acting as a taker, more than one prime broker may have access to the same dealable price. This problem is solved by including a prime broker priority list in the order submission message. This message is similar to that described above but instead of including the identity of one prime broker, includes a plurality of prime brokers in a priority list. This list is used by the trading system during deal initiation. Where the pbc is a taker, the trading system will choose the appropriate prime broker which has both literal credit with the counterparty and higher priority. Credit between the prime broker and the customer must also exist. The maker procedure is similar with the system using the priority list to decide, on receipt of a hit/take, to which prime broker the hit/take notification message should be sent.

Figure 11:
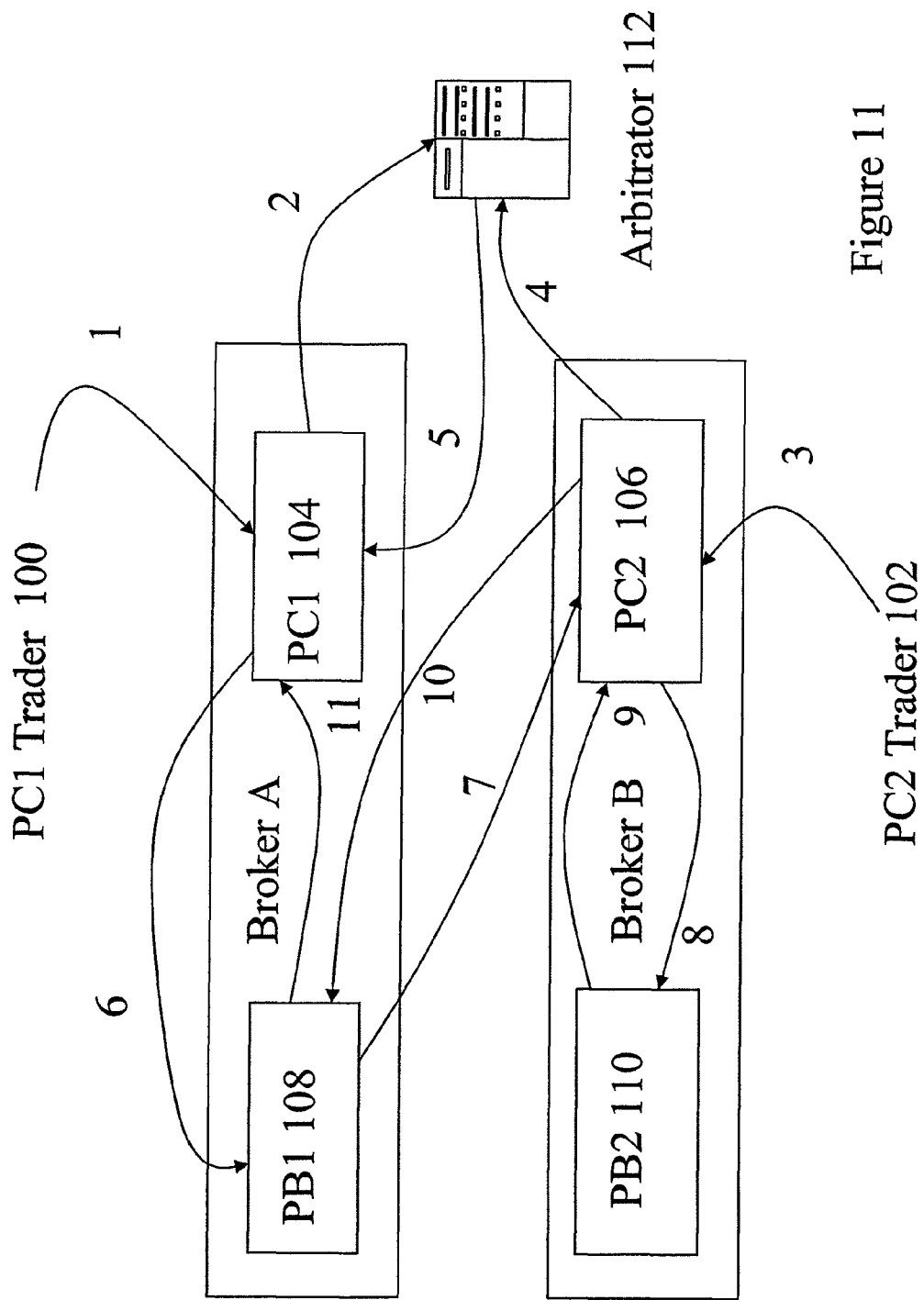
FIG. 11 is a schematic illustration of the message flow in a deal involving prime broker customers each using multiple prime brokers.

FIG. 11 illustrates the flow of messages in the multiple prime broker system. It is to be understood that the message flow is partly dependent on the system architecture and that the invention disclosed herein is not dependent on any particular architecture. The example given is therefore not to be construed as limiting in any way.

The figure shows two prime bank customer traders PC1 Trader 100 and PC2 Trader 102. These traders are in turn connected to the market by their trader terminals on their trading floors shown as PC1 Floor 104 and PC2 Floor 106. Each of floors PC1 and PC2 use the services of a respective prime broker bank PB1 108 and PB2 110 although each subscribe to several prime brokers and will trade using a different prime brokers credit depending on market conditions. Deal related messages are sent between the trading system and the two prime customers PC1 and PC2 and the two prime broker banks PB1 and PB2. In the figure, the trading system is represented by arbitrator 112 which is the part of the EBS system which is responsible for order matching. This is purely exemplary.

The PC1 trader at step 1 submits a quote into the market. In this example it is assumed that the quote, a visible buy or sell order, is the best price in the market. The PC1 trader wants this order to be executed using the services of one of his plurality of prime broker banks. At step 2 a quote submit message is sent from the PC1 trading floor 104 to the arbitrator and includes the prime broker priority list. The arbitrator will cause this quote to be distributed via a market distributor to trading floors with whom the selected prime broker has bilateral credit. One of these floors is floor PB2. By virtue of the prime broker/prime customer relationship between PB2 and PC2, trader PC2 102 will see PC1's quote on his trader terminal display as it is the best quote in the market, and the quote will be displayed as a dealable quote. Trader PC2 wants to trade and hits the quote at step 3. A hit is an invisible order and at step 4 a hit submit message is sent from the PC2 floor 106 to the arbitrator 112, the message including the PC2 floor's prime broker priority list. At step 5, the arbitrator sends to the maker floor PC1, a hit notify message which includes information about PC2 and the chosen prime broker for the hit, PB2. At step 6, a 'deal request maker' message is sent from the PC1 floor to the PB1 floor. This message includes information about the two prime customers PC1 and PC2 and PC2's prime broker PB2. This information is not visible to the trader at PC1 who, as it is an anonymous trading system, does not know the identity of the potential counterparty and, if the deal is completed, will only know that they have traded with prime bank PC2. A deal verify message is then sent at step 7 by PB1 to the prime customer PC2 which has hit the order. This message includes coded PB2 information but the prime customer sees only that it has traded with the prime parent. At step 8 a deal request taker message is sent from PC2 to PB2. As with the Deal Request Maker message, this message includes information about the opposing party PB1 and the prime customer PC2. At step 9, the prime broker PC2 acknowledges the Deal RequestTaker message with a DealRequestTakerAck message to the taker PC2. A deal verify acknowledge message DealVerifyAck is then sent from the PC2 floor to the PB1 floor at step 10 and finally at step 11, PB1 acknowledges the DealRequestMaker message with a DealRequestMakerAck message to the maker PC1.

It will be appreciated from the discussion above that the system described differs from that of WO2004/040422 in two major ways. First, the prime broker customer has its own deal code, and with that its own TFA. This gives rise to the possibility of assigning credit from the PC to the PB as well as the other way round. It also gives rise to the possibility of multiple deal codes at a single physical or virtual trading floor. This in turn enables traders on different deal codes on the same floor to deal with one another, so increasing liquidity. It also means that orders to be executed using prime broker credit as submitted direct from the prime broker client trading floor rather than via the prime broker.

The second major difference is the introduction of the hidden deal code.

The actual deal code used by the prime bank 1XYZ etc is masked so that counterparties are unable to see which prime bank has done the deal. The parent bank will be shown as the counterparty and will be the party whose name appears on the deal ticket. The use of hidden deal codes also prevents prime broker parents from seeing prime customer bids and offers.

The use of hidden or split deal codes has application outside the prime broker environment described above. One example is in allowing an existing deal code to be split into two without having to assign credit to a new floor. A split may be necessary when the dealing floor has more traders than can be handled by a single deal code. Although adding a new deal code into the system is straightforward, all counterparties must assign credit to the new deal code before it can trade effectively on the system. In practice, trading floor administrators are often reluctant and slow to assign credit to new trading floors and they need to be convinced that they are reliable codes to whom they can assign large amounts of credit without increasing risk.

By using hidden parent/child deal codes, the existing deal code can remain but has two child deal codes attached to it. Each child deal code has a number of traders within the total exceeding the number that could be handled by a single deal code. However, the outside market only sees the parent deal code and credit remains assigned to that parent deal code.

A further benefit of hidden or parent/child deal codes arises when a system is upgraded. At present, upgrading is a time consuming and costly exercise as the whole deal code will have to migrate to the upgraded system. This can mean a loss in trading time or a severe limitation as to when upgrades can take place; there are few times when all the world's foreign exchange markets are closed. In turn, this makes system operators very reluctant to upgrade systems unless they absolutely have to. Consequently systems do not develop or improve as fast as they might, with many potential enhancements waiting for the next major upgrade.

The use of parent and child deal codes overcomes this problem by assigning a pair of child deal codes to a parent deal code. One of the child codes carries on trading while the other migrates over to the new upgraded system. This allows the parent deal code to carry on trading while the new equipment is installed and tested. The migration over to the new system can then take place without any loss of trading capacity. This provides a technically elegant solution to the technical problem of handling upgrades and also makes it much more attractive for a system operator to make more frequent, less fundamental upgrades.

Other applications of parent and child deal codes are possible and will occur to those skilled in the art. The invention is not limited to the specific examples described above and is limited only by the following claims.

The invention claimed is:

1. A trading floor administrator computer for an electronic trading system for trading products between potential counterparties, wherein each of the potential counterparties is at least one of a parent counterparty associated with a parent trading floor code and a dependent counterparty associated with a dependent trading floor code dependent on a parent trading floor code, the trading floor administrator computer comprising:
   a data store configured to store counterparty trading limits of at least one parent counterparty with at least one other counterparty for trades to buy or sell products on the electronic trading system using the dependent trading floor code associated with a dependent counterparty, said dependent trading floor code dependent on the parent trading floor code associated with the at least one parent counterparty; and
   an interface configured to communicate a market view based on the counterparty trading limits stored in the data store to at least one trader terminal of the at least one dependent counterparty using the dependent trading floor code dependent on the parent trading floor code associated with the at least one parent counterparty and using the counterparty trading limits of the at least one parent counterparty stored in the data store.

2. The trading floor administrator computer according to claim 1, wherein the counterparty trading limits comprise credit limits.

3. A method on a trading floor administrator computer for an electronic trading system for trading products between potential counterparties, wherein each of the potential counterparties is at least one of a parent counterparty associated with a parent trading floor code and a dependent counterparty associated with a dependent trading floor code dependent on a parent trading floor code, the method comprising:

the trading floor administrator computer storing counterparty trading limits of at least one parent counterparty with at least one other counterparty for trades to buy or sell products on the electronic trading system using the dependent trading floor code associated with a dependent counterparty, said dependent trading floor code dependent on the parent trading floor code associated with the at least one parent counterparty; and the trading floor administrator computer communicating a market view based on the counterparty trading limits stored in the data store to at least one trader terminal of the at least one dependent counterparty using the dependent trading floor code dependent on the parent trading floor code associated with the at least one parent counterparty and using the counterparty trading limits of the at least one parent counterparty stored in the data store.

4. The method according to claim 3, wherein the counterparty trading limits comprise credit limits.

* * * * *